(12) United States Patent
Walk

(10) Patent No.: US 10,308,301 B2
(45) Date of Patent: Jun. 4, 2019

(54) VEHICLE SEAT WITH STORAGE CAPACITY

(71) Applicant: Mitch Walk, Murrieta, CA (US)

(72) Inventor: Mitch Walk, Murrieta, CA (US)

( * ) Notice: Subject to any disclaimer, the term of this patent is extended or adjusted under 35 U.S.C. 154(b) by 0 days.

(21) Appl. No.: 15/341,790

(22) Filed: Nov. 2, 2016

(65) Prior Publication Data
US 2017/0136955 A1 May 18, 2017

Related U.S. Application Data

(60) Provisional application No. 62/249,349, filed on Nov. 2, 2015.

(51) Int. Cl.
*B60N 2/58* (2006.01)
*B62J 1/18* (2006.01)
*B62J 9/00* (2006.01)

(52) U.S. Cl.
CPC ............. *B62J 1/18* (2013.01); *B60N 2/5816* (2013.01); *B62J 9/00* (2013.01)

(58) Field of Classification Search
CPC ........... B60R 7/043; B60R 7/00; B60R 7/005; B60R 7/04; B60R 7/08; B60R 7/081–7/088; B60N 2/5816; B60N 2/58; B60N 2/5825; B60N 2/5858; B62J 1/18
USPC .............................. 297/452.48, 452.58, 452.6
See application file for complete search history.

(56) References Cited

U.S. PATENT DOCUMENTS

| | | | | |
|---|---|---|---|---|
| 1,991,751 A | * | 2/1935 | Kennedy | B62J 1/20 297/214 |
| 2,132,544 A | * | 10/1938 | Shaw | B63C 9/115 441/115 |
| 2,710,052 A | * | 6/1955 | Witmer | A47D 15/006 297/452.17 |
| 3,295,887 A | * | 1/1967 | Bacon | B60N 2/6027 224/275 |
| 4,025,105 A | * | 5/1977 | Pekala | A47C 7/021 297/4 |
| 4,319,781 A | * | 3/1982 | Tsuge | B62J 1/18 150/167 |
| 4,747,639 A | * | 5/1988 | Pfau | B60N 2/643 297/219.1 |
| 4,786,104 A | * | 11/1988 | Fellenbaum | B62J 1/20 150/167 |
| 4,942,993 A | | 7/1990 | Delgado | |
| 6,024,397 A | | 2/2000 | Scraver | |
| 6,149,229 A | | 11/2000 | Dillon | |
| 6,161,896 A | | 12/2000 | Johnson | |
| 6,981,730 B2 | | 1/2006 | Bixby | |
| 7,523,991 B2 | * | 4/2009 | Thompson | B60N 2/58 297/452.38 |
| 8,596,714 B2 | | 12/2013 | Whitman | |
| 2008/0252091 A1 | * | 10/2008 | Edwards | B60R 7/043 296/37.15 |
| 2009/0014602 A1 | * | 1/2009 | Frost | B60R 7/08 248/100 |

(Continued)

*Primary Examiner* — Mark R Wendell

(57) ABSTRACT

A seat for use with a vehicle is provided. The seat includes a base, a cushioning material coupled to the base, an outer cover positioned over the base and the cushioning material, the outer cover including at least one accessory portion comprising at least one strap coupled to a seam of the outer cover and a securement component coupling the at least one strap to the outer cover.

13 Claims, 10 Drawing Sheets

(56) References Cited

U.S. PATENT DOCUMENTS

| | | | | |
|---|---|---|---|---|
| 2011/0049948 A1* | 3/2011 | Hobl | ............... | B60N 2/5825 |
| | | | | 297/218.2 |
| 2011/0095578 A1* | 4/2011 | Festag | ............... | B60R 21/207 |
| | | | | 297/216.1 |
| 2012/0138649 A1* | 6/2012 | Kreis | ............... | B60N 3/108 |
| | | | | 224/483 |
| 2013/0068919 A1* | 3/2013 | Antonioni | ............ | F16M 13/00 |
| | | | | 248/614 |
| 2013/0193179 A1* | 8/2013 | Davidson | ............ | A45F 5/00 |
| | | | | 224/585 |
| 2015/0035325 A1* | 2/2015 | Gagnier | ............... | B60N 2/58 |
| | | | | 297/188.04 |
| 2017/0101041 A1* | 4/2017 | Galbreath | ............ | B60N 2/643 |
| 2017/0274745 A1* | 9/2017 | Lewis | ............... | B60R 5/04 |

\* cited by examiner

VEHICLE SEAT WITH STORAGE CAPACITY

CROSS-REFERENCE TO RELATED APPLICATIONS

This application is claiming the benefit of provisional application No. 62/249,349 filed Oct. 2, 2015 under 35 U.S.C. 119(e), the entirety of which is incorporated by reference herein.

BACKGROUND

The embodiments described herein relate generally to vehicle seats and more specifically to vehicle seats having the capability of providing additional storage directly to the seat.

Currently open air vehicles (e.g. motorcycles, ATVs, etc.) have limited space for storage on the vehicle. The lack of storage is particularly problematic for those travelling extended distances on or in the vehicles. As such, there is a need to easily and cost-effectively provide additional storage options to open air vehicles.

BRIEF DESCRIPTION

In one aspect, seat for use with a vehicle is provided. The seat including a base, a cushioning material coupled to the base, an outer cover positioned over the base and the cushioning material. The outer cover including at least one accessory portion having at least one strap coupled to a seam of the outer cover and a securement component coupling the at least one strap to the outer cover.

BRIEF DESCRIPTION OF THE DRAWINGS

FIG. 1 is a perspective view of an exemplary vehicle with an exemplary seat;

FIG. 2 is a cut-away view of the seat shown in FIG. 1;

FIG. 3 is a perspective view of the seat shown in FIG. 1;

FIG. 4 is a perspective view of an accessory coupled to a portion of the seat shown in FIG. 3;

FIG. 5 is a front perspective view of a seat for use with a vehicle;

FIG. 6 is a rear perspective view of the seat shown in FIG. 5;

FIG. 7 is a rear perspective view of the seat shown in FIG. 5 with a retrofit accessory assembly;

FIG. 8 is a rear perspective view of the seat shown in FIG. 5 with an alternative retrofit accessory assembly;

FIG. 9 is a rear perspective view of the seats shown in FIG. 5 with an accessory assembly that extends between two adjacent seats; and FIG. 10 is a perspective view of an exemplary vehicle for use with the seats shown in FIGS. 5-9.

DETAILED DESCRIPTION

Figure 1:
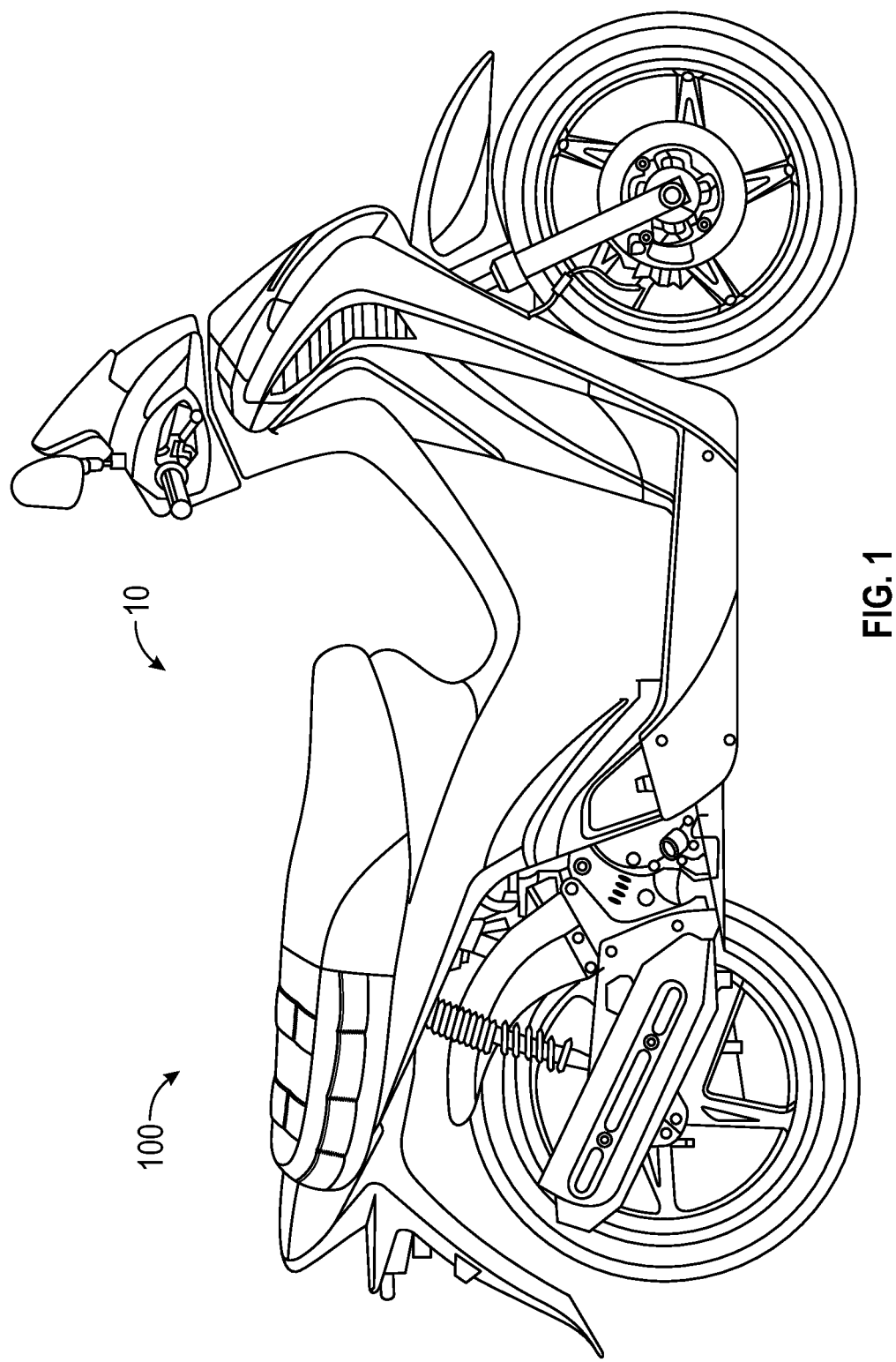
FIGS. 1-10 show exemplary embodiments of the seat system described herein.

FIG. 1 is a perspective view of an exemplary vehicle 10 having a seat 100. It should be noted that while vehicle 10 is depicted as a motorcycle or scooter, vehicle 10 can be any open air vehicle including, but not limited to, scooters, mopeds, monkey bikes, Welbikes, minibikes, enduro motorcycles, all-terrain vehicles (ATV), four-wheelers, three-wheelers, utility task vehicles (UTV), military light utility vehicles, off-road vehicles, sport utility vehicles (SUV), Jeeps, bicycles, trucks, delivery trucks, agricultural vehicles, tractors, construction vehicles, earth movers, bulldozers, planes, boats, buses, multi-stop trucks, walk-in delivery or step vans, and motorized bicycles. In the exemplary embodiment, seat 100 is fabricated to accommodate one rider but can be fabricated to accommodate any number of riders including, but not limited to, 2, 3, 4, and 5.

Figure 2:
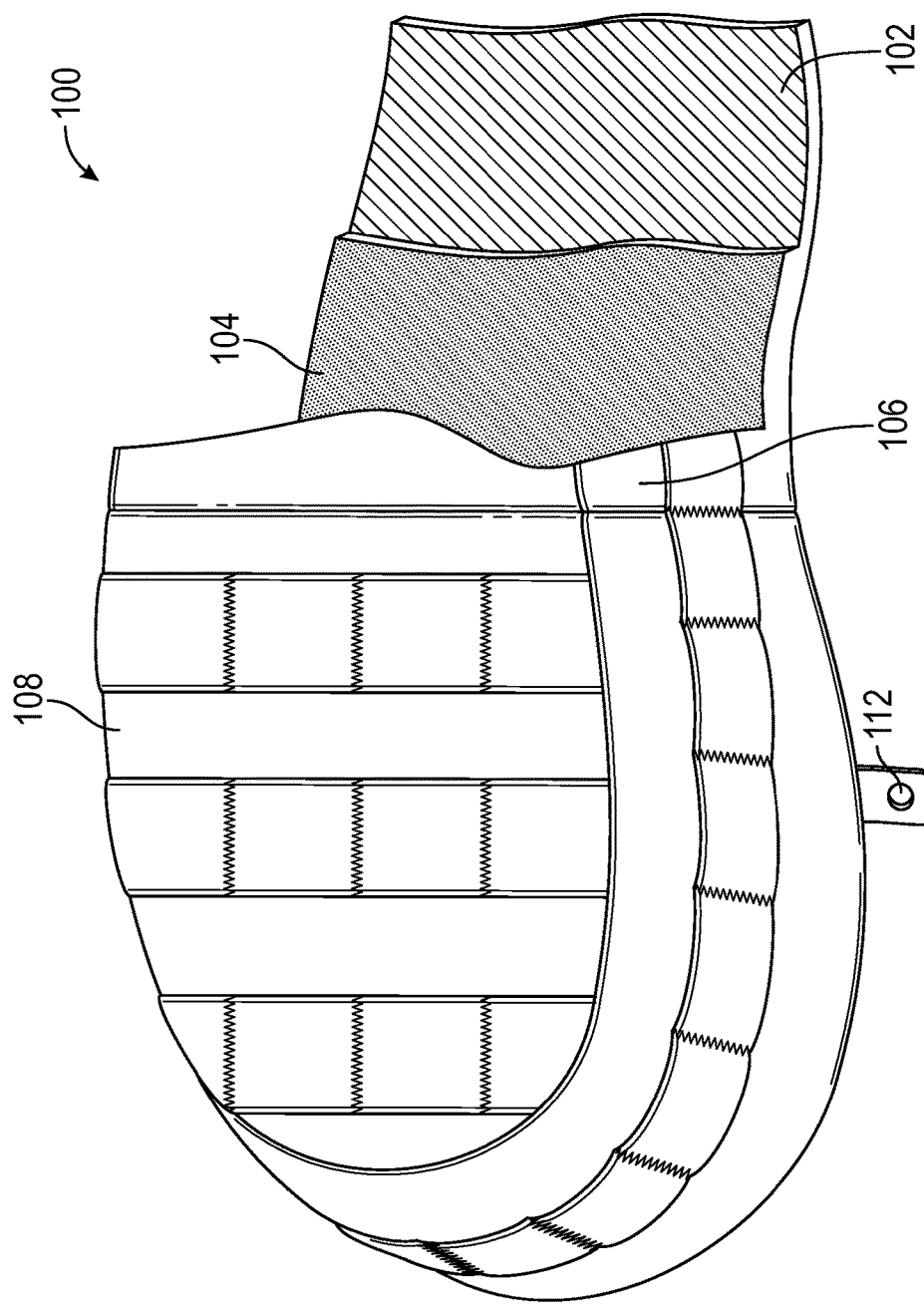

FIG. 2 is a cut-away view of seat 100 shown in FIG. 1. Seat 100 is fabricated to include a frame 102 with a cushion 104 coupled to or positioned on frame 102. In one embodiment, frame 102 is fabricated as a shell that is molded into a desired shape. Alternatively, frame can be constructed with the use of tubes and/or links to form a base for seat 100. In the exemplary embodiment, frame 102 is formed from plastic, however, frame 102 can be formed using any material that supports a rider and/or passenger including, but not limited to, steel, aluminum, carbon fiber, polyurethane, polyester, polyethylene, polypropylene, and polyvinyl chloride. In some embodiments, elastic supports extend across frame 102 create a suspension seat.

Cushion 104 is configured to provide support and comfort to the rider(s) of vehicle 10. In one embodiment, cushion 104 is foam. Cushion 104 can include any type of foam and/or support including, but not limited to, rebond foam, closed-cell foam, neoprene foam, polyurethane cushioning foam, memory foam (viscoelastic polyurethane foam), and/or a viscoelastic polymer gel. Cushion 104 may be coupled to frame 102 with an adhesive or be positioned against frame 102 in substantially friction fit. In some embodiments, a first covering 106 is positioned over cushion 104 and an outer covering 108 substantially positioned over first covering 106. Alternatively, outer covering 108 may be positioned over cushion 104 without a first covering 106. In some embodiments, coverings 106 and 108 are coupled to frame 102 with a securement component such as staple, glue, screw, nail, button, snap, and grommet. In the exemplary embodiment, seat 100 includes at least one tab 110 extending from frame 102 to enable seat 100 to securely couple to vehicle 10. Tab 110 includes an aperture 112 to enable a securement component to extend through aperture 112 and into vehicle 10.

Figure 3:
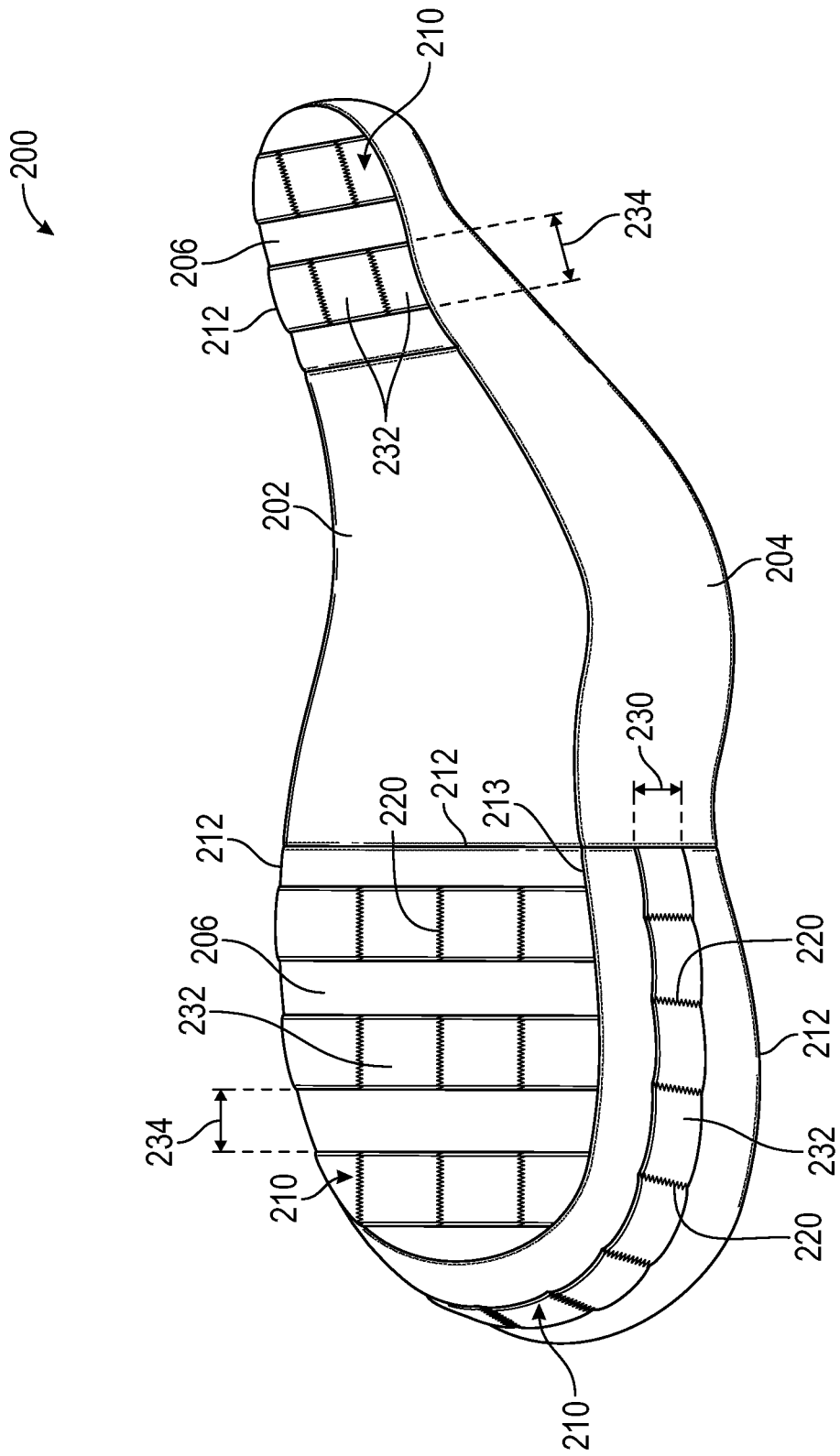

FIG. 3 is a perspective view of seat 200, shown as seat 100 in FIGS. 1 and 2. In the exemplary embodiment, seat 200 includes a rider portion 202, a leg portion 204, and at least one accessory portion 206. In one embodiment, rider portion 202 and leg portion 204 are fabricated with polyvinyl chloride (i.e. vinyl). Alternatively, rider and leg portions 202 and 204 can be covered with any material that facilitates seating including, but not limited to, polyethylene, polypropylene, leather, and nylon. In some embodiments, the vinyl utilized on seat 200 is a gripper and/or grabber vinyl that is substantially slip resistant to help retain a rider in place during travel. Such vinyl can be a stretch vinyl having four-way and/or all-way stretching capabilities. In some embodiments, when polyester or nylon is utilized, the material is in the range of 200-1700 deniers but could have any density that facilitates covering seat 200 as described herein.

Accessory portion 206 is fabricated with polyester. Alternatively, accessory portion 206 can be fabricated with any of the materials that are suitable for use with rider and leg portions 202 and 204. In the exemplary embodiment, multiple accessory straps 210 extend from accessory seams 212 and are positioned on the polyester covering accessory portion 206. Straps 210 can be oriented in any direction on seat 200 including, but not limited to, horizontally or vertically.

In the exemplary embodiment, seams are formed by one material being positioned on another and secured with stitching. For example, seam 213 is formed from one portion of the vinyl being positioned on or over the other portion of vinyl and strap 210 and being secured together with stitching. In some embodiments, seams 212 are secured with bar tack stitching. It should be noted that in addition to bar tack stitching, any type of stitch can be used to secure seams, including a running stitch, backstitch, overcast stitch, cross stitch, buttonhole or blanket stitch, chain stitch, knot stitch, lockstitch, overlock, and cover stitch.

In addition to or alternative to stitching, seams can be secured in any manner that facilitates fabric securement including, but not limited to, ultrasonic welding and gluing. Additionally, the seams can be any type of seam including, but not limited to, plain seams, French seams, flat or abutted seams, or lapped seams. In some embodiments, piping or cording is inserted into or positioned over the seams.

In the exemplary embodiment, straps 210 are not only secured to seat 200 by seams 212 but also loop securement components 220. In such an embodiment, loop securement components 220 are stitches arranged in a bar tack stitching pattern. However, components 220 can be any form of securement including stitching using the stitching patterns described above, ultrasonic welding, and gluing. In the exemplary embodiment, straps 210 are polyester however straps 210 can be any material that facilitates securing items to seat 200 including, but not limited to, polypropylene, leather, and nylon. As an alternative to straps 210 extending between seams 212, individual pieces of material can be secured to accessory portion 206 to achieve a substantially similar effect.

In the exemplary embodiment, accessory portion 206 is formed to create a Modular Lightweight Load-carrying Equipment (MOLLE) system or Pouch Attachment Ladder System (PALS). In some embodiments, straps 210 are fabricated with a height 230 in the range of 0.25 inches to 3 inches. In the exemplary embodiment, straps 210 have a height 230 of approximately 1 inch. Components 220 form sections 232 in straps 210. In one embodiment, components 220 are utilized to form sections 232 having a width of have approximately 1.5 inches. In some embodiments, sections 232 are configured to be in the range of 0.25 inches to 4 inches wide. In some embodiments, the distance 234 between adjacent straps 210 is approximately 1 inch. However, straps 210 can be positioned any distance 234 apart in the range of 0.25 inches to 4 inches. In the exemplary embodiment, sections 232 are configured to enable securement or attachment of items (e.g. straps, clips, or MOLLE stick) by inserting items between strap 210 and the cover. Alternately, accessory portion 206 can have sections 232 and/or straps 210 in any orientation, having any size, with any spacing that facilitates attaching accessories to seat 200.

In addition to the embodiments described above with reference to accessory portion 206, the loops (i.e. sections 232) can be formed in accessory portion 206 by weaving straps through each other to create a loop system. Such system can be secured to seat 200 as described by the various securement methods above. It should also be noted that seat 200 can be fabricated to be positioned on a pre-existing seat of a vehicle. The seat would be positioned over the pre-existing seat and secured to the frame using materials and/or methods described herein including, but not limited to including, zippers, snaps, magnets, and gluing.

Figure 4:
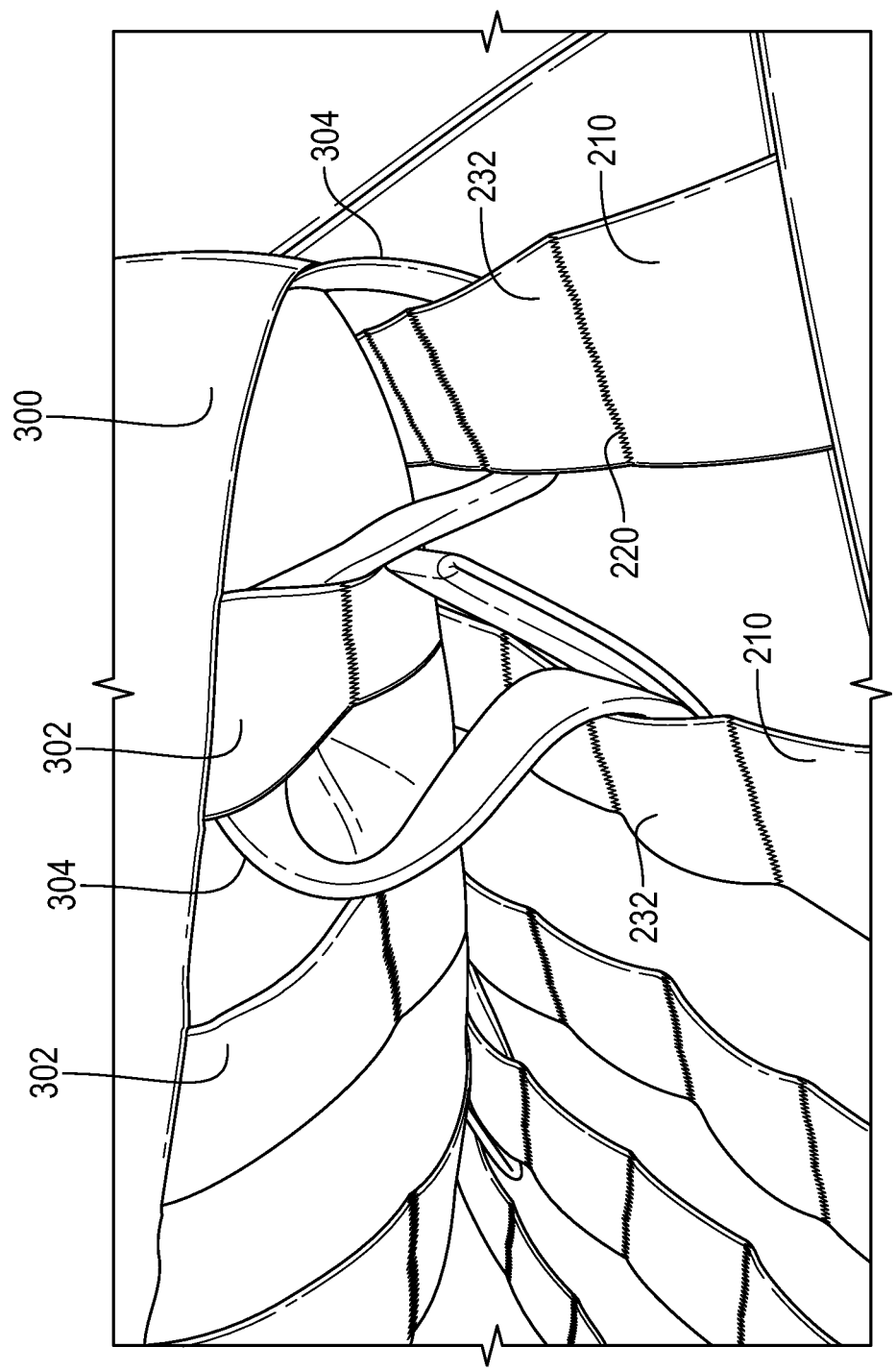

FIG. 4 is a perspective view of an accessory 300 coupled to accessory portion 206 of the seat 200 shown in FIG. 3. In the exemplary embodiment, accessory 300 is a bag, sack, or pack with straps 302 that substantially correspond with the size, width, and orientation of straps 210. Additionally, accessory 300 includes at least one securement strap 304 that extends from accessory 300. Strap 304 is configured to loop in and out of straps 210 and 302, and more particularly, sections 232. After securement straps are looped through straps 210 and 302, accessory 300 is coupled to vehicle 10 to provide additional storage to the vehicle while remaining secure at high rates of speed over long distances.

Figure 5:
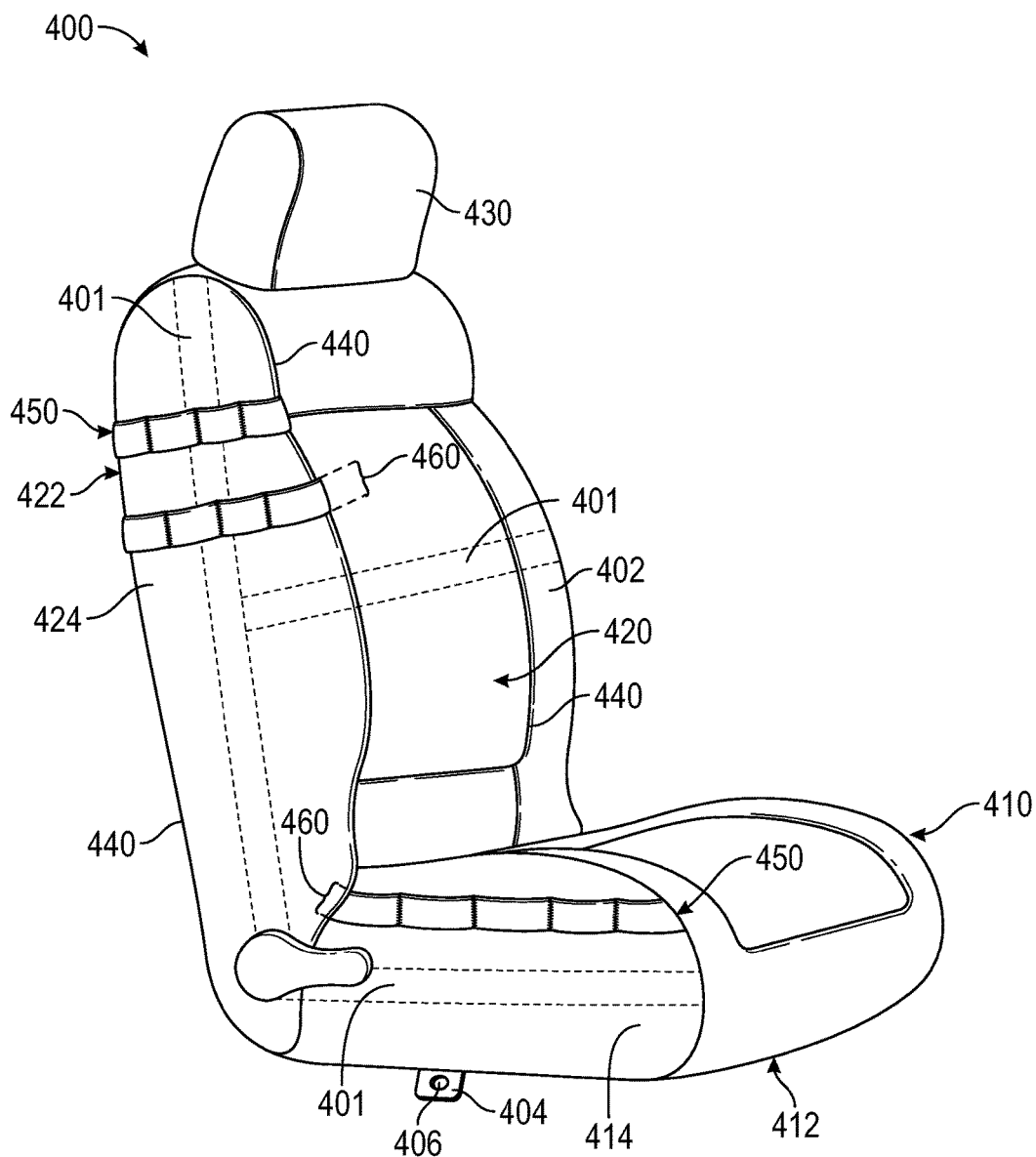
Figure 6:
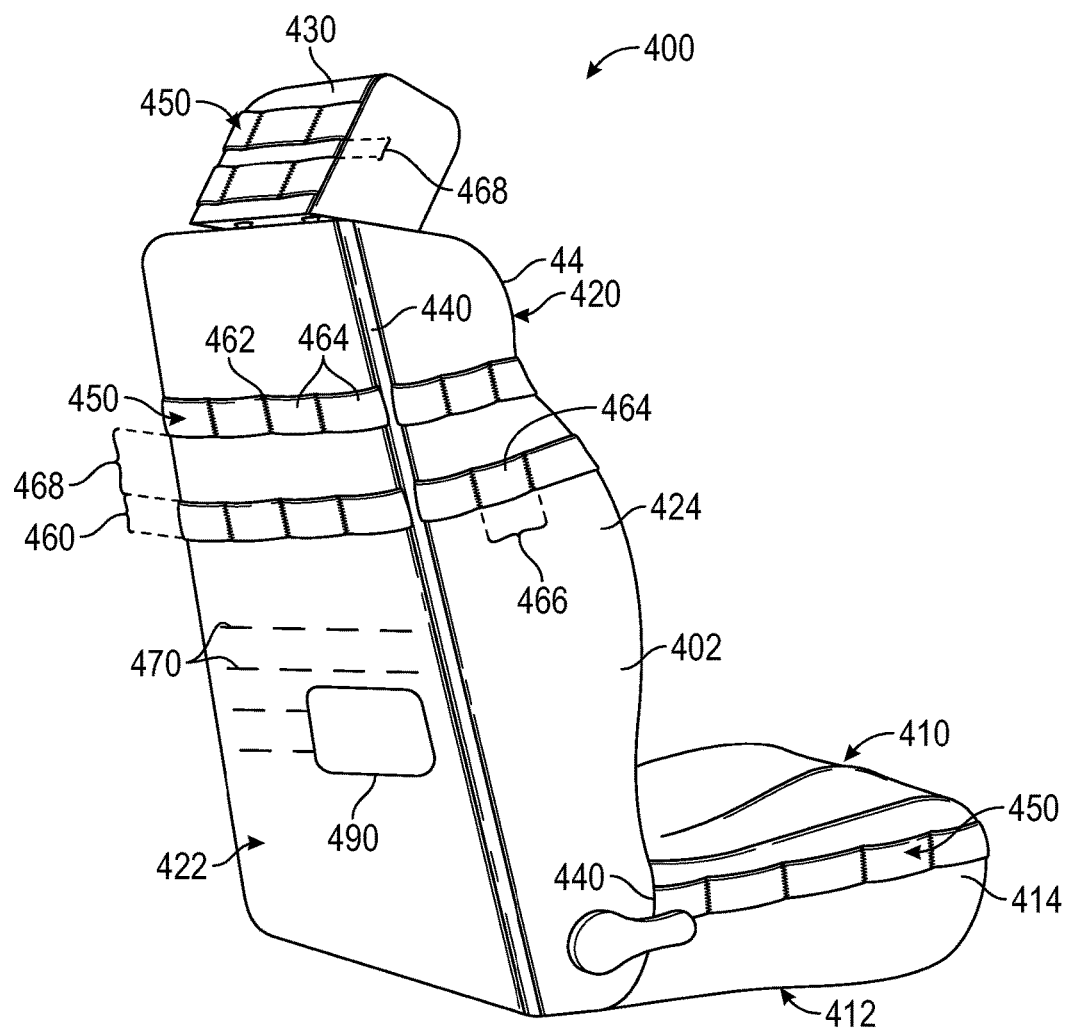
Figure 10:
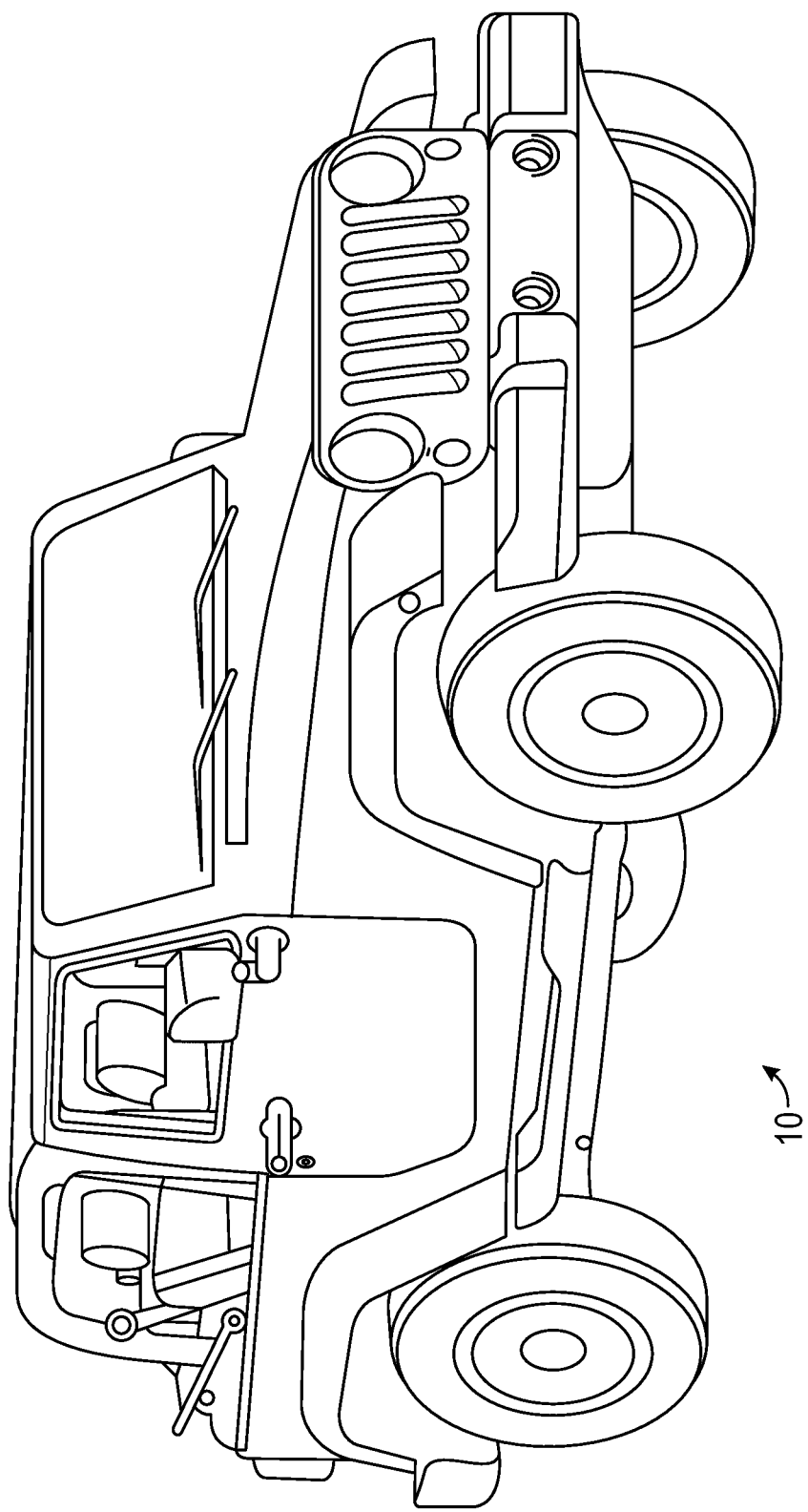

FIG. 5 is a front perspective view of an exemplary view of a seat 400 for use with a vehicle 10 and FIG. 6 is a rear perspective view of seat 400, shown in FIG. 5. In the exemplary embodiment, seat 400 is utilized within an off-road vehicle, such as a JEEP®, shown in FIG. 10. Alternatively, seat 400 can be utilized with any vehicle 10 described herein including, but not limited to, all-terrain vehicles (ATV), four-wheelers, three-wheelers, utility task vehicles (UTV), military light utility vehicles, off-road vehicles, sport utility vehicles (SUV), trucks, delivery trucks, agricultural vehicles, tractors, construction vehicles, earth movers, bulldozers, planes, boats, buses, multi-stop trucks, and walk-in delivery or step vans. Similar to seat 100, seat 400 is fabricated to include a frame 401 with a cushion coupled to or positioned on the frame 401. Additionally, in some embodiments, elastic supports extend across frame 401 to create a suspension seat in seat 400.

In one embodiment, the frame 401 is fabricated as a shell that is molded into a desired shape. Alternatively, the frame 401 can be constructed with the use of tubes and/or links to form a base for seat 400. In the exemplary embodiment, the frame 401 is formed from plastic, however, the frame 401 can be formed using any material that supports a rider and/or passenger including, but not limited to, steel, aluminum, carbon fiber, polyurethane, polyester, polyethylene, polypropylene, and polyvinyl chloride.

The cushion is configured to provide support and comfort to the rider(s) of vehicle 10. In one embodiment, the cushion is foam. The cushion can include any type of foam and/or support including, but not limited to, rebond foam, closed-cell foam, neoprene foam, polyurethane cushioning foam, memory foam (viscoelastic polyurethane foam), and/or a viscoelastic polymer gel. The cushion may be coupled to the frame 401 with an adhesive or be positioned against the frame 401 in substantially friction fit. In some embodiments, a first covering is positioned over the cushion and an outer covering 402 substantially positioned over first covering. Alternatively, outer covering 402 may be positioned over the cushion without a first covering. In some embodiments, the first covering and outer covering 402 are coupled to the frame 401 with a securement component such as staple, glue, screw, nail, button, snap, and grommet. In the exemplary embodiment, seat 400 includes at least one tab 404 extending from the frame 401 to enable seat 400 to securely couple to vehicle 10. Tab 404 includes an aperture 406 to enable a securement component to extend through aperture 406 and into vehicle 10.

In the exemplary embodiment, seat 400 includes an outer covering 402 fabricated from a cloth material. Alternatively, outer covering 402 can be fabricated from any material that supports a rider including, but not limited to, mesh, leather, vinyl, and wool. In the exemplary embodiment, seat 400 forms a top base portion 410, a bottom base portion 412, and a base side panels disposed between portions 410 and 412. Seat 400 also includes a front back portion 420, a rear back portion, 422, and back side panels 424 disposed between portions 420 and 422. A headrest 430 is positioned on front and rear back portions 420 and 422. In some embodiments, headrest 430 is adjustable in seat 400 by moving headrest 430 relative to the frame 401 of seat 400. Seat 400 is configured such that a rider sits on top base portion 410 and positions against front back portion 420 and headrest 430.

In the exemplary embodiment, seat 400 is fabricated by positioning outer covering 402 over frame 401 and/or the cushioning material. Outer covering 402 is fabricated to produce seams 440 where two pieces of outer covering 402 are joined together. In the exemplary embodiment, seams 440 are joined using stitching to join portions of outer covering together. In some embodiments, seams 440 are secured with bar tack stitching. Alternatively, any type of stitch can be used to secure seams, including a running stitch, backstitch, overcast stitch, cross stitch, buttonhole or blanket stitch, chain stitch, knot stitch, lockstitch, overlock, and cover stitch. In addition to or alternative to stitching, in some embodiments, seams 440 are formed by joining portions of outer covering 402 together in any manner that facilitates fabric securement including, but not limited to, ultrasonic welding and gluing. Additionally, the seams 440 can be any type of seam including, but not limited to, plain seams, French seams, flat or abutted seams, or lapped seams. In some embodiments, piping or cording is inserted into or positioned over the seams 440.

In the exemplary embodiment, seat 400 includes accessory components 450 coupled to outer covering 402. In some embodiments, accessory components 450 are secured to outer covering 402 by being coupled to seams 440. In the exemplary embodiment, accessory components 450 are stitched into seams 440. Alternatively, accessory components 450 can be coupled to outer covering 402 in any manner that secures component 450 to covering 402 including, but not limited to, ultrasonically welding, heat staking, and gluing. Additionally, in some embodiments, securement components (e.g., hook and loop or snaps) are utilized to secure component 450 to covering 402.

In the exemplary embodiment, accessory components 450 are fabricated with nylon webbing. Alternatively, accessory components 450 can be fabricated from any material that facilitates securing items to seat 400 including, but not limited to, polyester, polypropylene, and leather. In some embodiments, components 450 are fabricated from nylon having a denier between 100 and 2000. In one embodiment, components 450 are fabricated from with 1000D nylon webbing.

In the exemplary embodiment, accessory components 450 are formed to create a MOLLE system or PALS system. In some embodiments, components 450 are fabricated with a length 460 to be in the range of 0.25 inches to 3 inches. In the exemplary embodiment, components 450 have a length 460 of approximately one inch. In some embodiments, components 452 are further secured to outer covering 402 by a securement component 462. In one embodiment, securement component 462 is a stitching (e.g., bar tack stitching) utilizing at least one of the stitches described above. Alternatively, securement component 462 can be any securement component that secures component 450 to covering 402 including, but not limited to, an ultrasonic weld and glue.

In the exemplary embodiment, securement component 462 forms sections 464 in component 450 that enable a user to position items under or between covering 402 and component 450. In some embodiments, sections 464 are fabricated to a width 466 in the range of 0.25 inches to 4 inches. In one embodiment, sections 464 are fabricated to a width 466 of approximately 1.5 inches. In some embodiments, components 450 are secured to outer covering 402 with a distance 468 in the range of 0.25 inches to 4 inches between adjacent components 450. In one embodiment, distance 468 between adjacent components 450 is approximately 1 inch. It should be noted that sections 464 are secured to covering 402 to allow items (e.g. straps, clips, or MOLLE stick) to be inserted between component 450 and outer covering 402.

Alternately to having accessory components 450 be fabricated from a single piece of material that is positioned on covering 402, in some embodiments, apertures or slots 470 are formed in covering 402. In such embodiments, slots 470 are created by cutting (e.g., laser cutting) to provide a MOLLE system or PALS system integrated into the covering 402. It should be noted that slots 470 are formed to be in the same dimensional ranges described above for component 450. For example, in one embodiment, slots 470 are formed having a width 466 of approximately 1.5 inches with a distance 468 between slots of approximately 1 inch.

Seat 400 is fabricated to enable weaving straps through components 450 and/or slots 470 to secure additional storage devices 490 to seat 400, such as is described above and shown in FIG. 4. The systems described above facilitate a user to securely attach devices 490 (e.g., pouches, bags, and hooks) to a seat 400 while traveling in an open air vehicle 10. It should be noted that seat 400 and/or outer covering 402 can be fabricated to be positioned on or over a pre-existing seat of a vehicle. In such an embodiment, covering 402 is positioned over the pre-existing seat and secured to the pre-existing seat by a zipper, snaps, stitching, and/or gluing.

Figure 7:
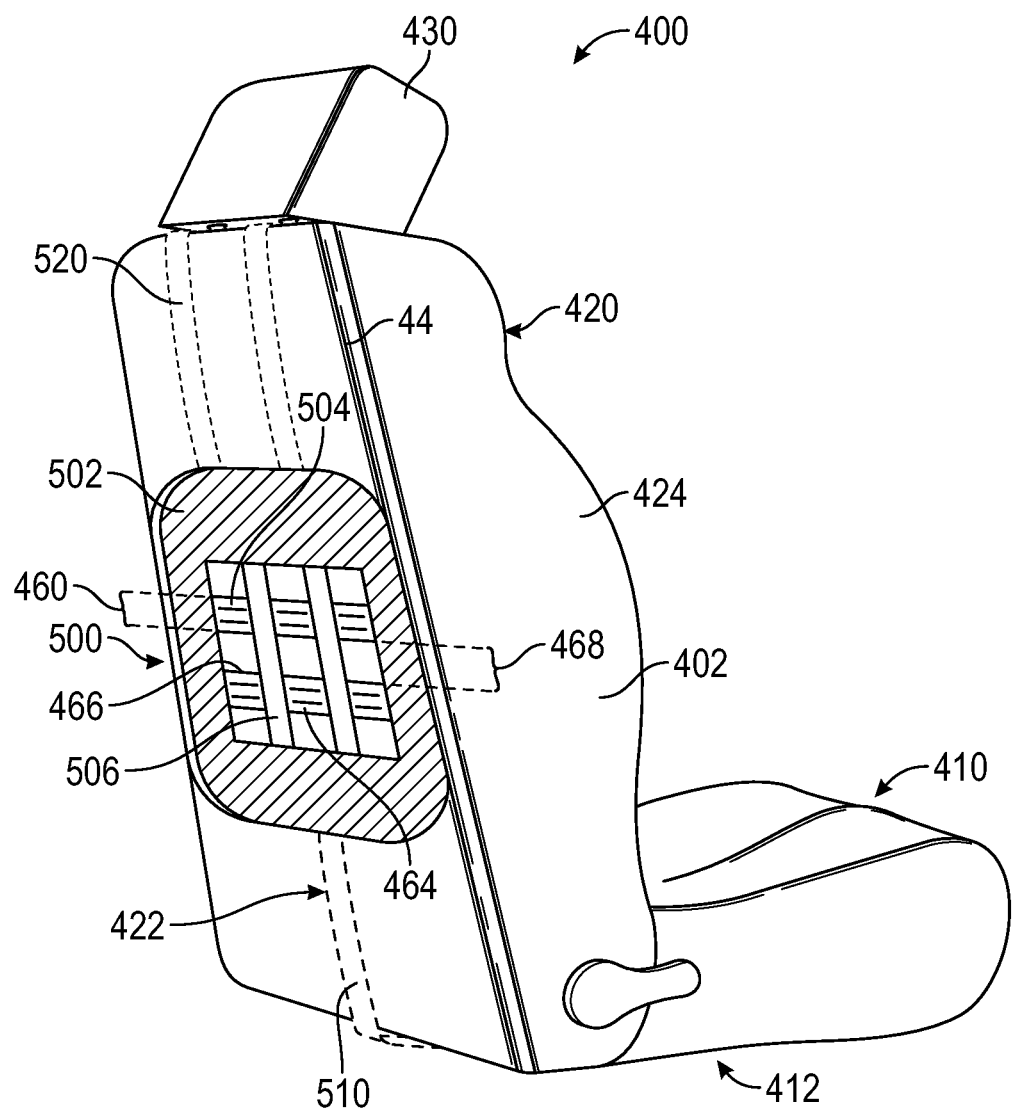

FIG. 7 is a rear perspective view of seat 400 with a retrofit accessory assembly 500. In the exemplary embodiment, assembly 500 includes a frame 502, securement straps 504, and stabilizing components 506. In some embodiments, frame 502 and/or components 506 are fabricated from a plastic material that can be molded into a desired shaped to contour to a pre-existing shape of a rear back portion 422. Alternatively, frame 502 can be fabricated from any material that enables coupling of assembly 500 to seat 400 including, but not limited to, composite material, metal, synthetic fiber, natural fiber, wood, and any combination thereof. In some embodiments, frame 502 is fabricated to replace the map holders that are included as a standard component of a stock or original seat in a vehicle 10 using the same attachment mechanism (e.g., screws, snaps, glue, etc).

Straps 504 are coupled to frame 502 having components 506 positioned thereon to provide sections 464 similar to that of component 450 shown in FIGS. 5 and 6. Assembly 500 enables a pre-existing seat 400 to create a MOLLE system or PALS system. As such, assembly 500 can be formed to enable a user to position items under or between seat 400 and assembly 500 and/or straps 504. In some embodiments, straps 504 are fabricated with a height 460 to be in the range of 0.25 inches to 3 inches. In the exemplary embodiment, straps 504 have a height 460 of approximately one inch. In some embodiments, sections 464 are fabricated to a width 466 in the range of 0.25 inches to 4 inches. In one embodiment, sections 464 are fabricated to a width 466 of approximately 1.5 inches. In some embodiments, straps 504 are positioned a distance 468 apart in the range of 0.25 inches to 4 inches. In one embodiment, distance 468 between adjacent straps 468 is approximately 1 inch.

In one embodiment, assembly 500 is secured to seat 400 by bolting or screwing frame 502 to portions of seat 400 (e.g., rear back portion 422 and/or frame 401). In one embodiment, frame 502 can be fabricated to include projections that mate with apertures or slots formed in the rear back portion 422 of seat 400. In an alternative embodiment, assembly 500 is secured to seat 400 by a stabilizing member 510 extending from frame 502 down portion 422 and under bottom base portion 412 enabling stabilizing member 510 to couple to frame 401. In such an embodiment, member 510 is fabricated from a material that facilitates supporting assembly 500 including at least one of composite material, metal, synthetic fiber, natural fiber, wood, and any combination thereof.

Alternatively, assembly 500 can couple to seat 400 with any component that facilitates securement to seat 400 including but not limited to including, hook and loop material (Velcro), glue, snaps, screws, ultrasonic welding, heat staking, and stitching. In some embodiments, assembly 500 is positioned on seat 400 by straps or posts 520 that extend from headrest 430 and/or frame 410 extending through seat 400. Additionally, frame 502 can couple to straps 504 and/or components 506 using the securement components described for assembly 500 and seat 400. It should also be noted that straps or posts 520 could also extend from any portion of vehicle 10 to secure assembly 500 including, but not limited to, the floors, roofs, and center consoles.

Figure 8:
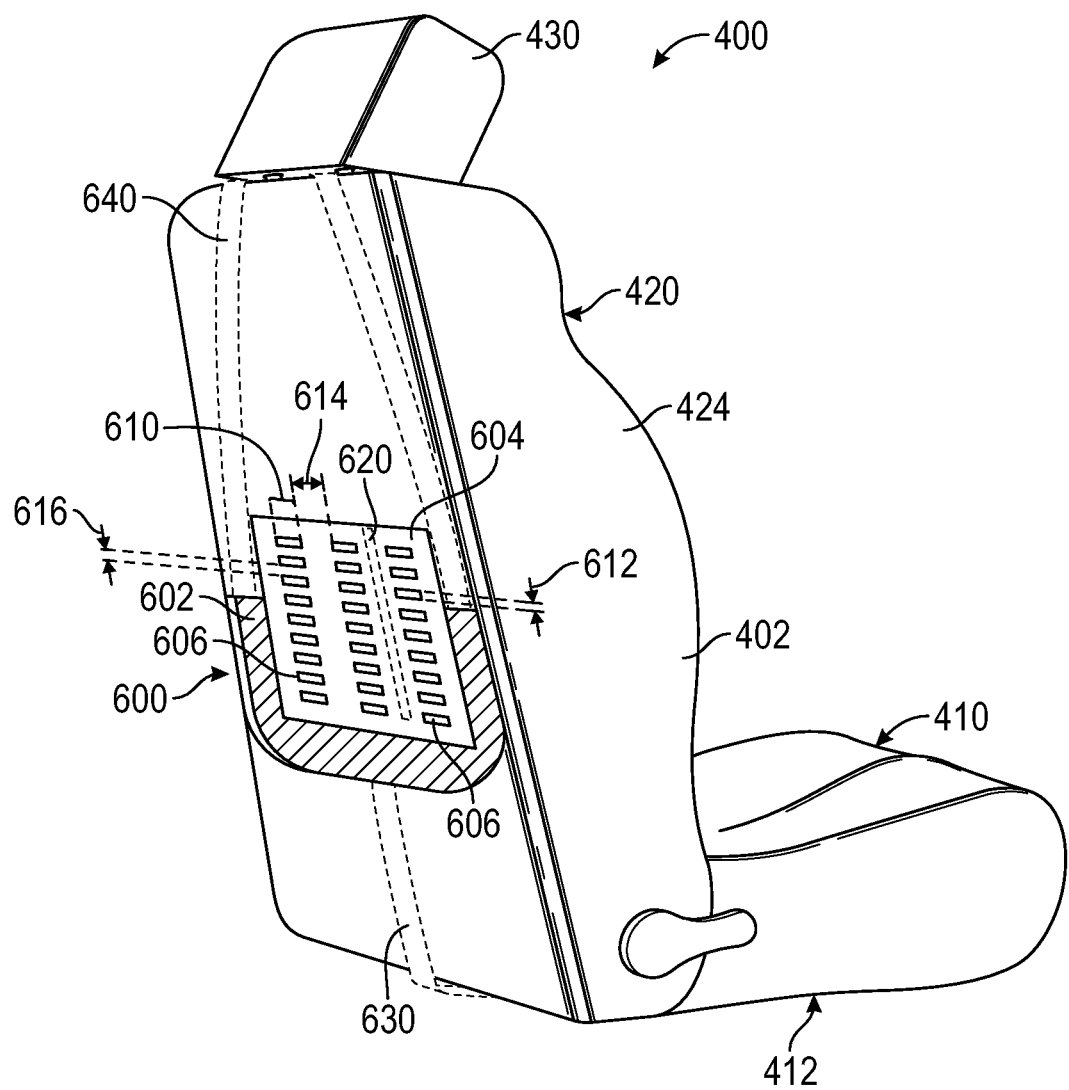

FIG. 8 is a rear perspective view of seat 400 with a retrofit accessory assembly 600. In the exemplary embodiment, assembly 600 includes a frame 602 and an accessory securement component 604. In some embodiments, frame 602 is fabricated from a plastic material that can be molded into a desired shaped to contour to a pre-existing shape of a rear back portion 422. Alternatively, frame 502 can be fabricated from any material that enables coupling of assembly 600 to seat 400 including, but not limited to, composite material, metal, synthetic fiber, natural fiber, wood, and any combination thereof. In one embodiment, frame 602 partially encompasses component 604. Alternatively, frame 602 can be fabricated to fully surround or encompass the edges of component 604. In some embodiments, frame 602 is fabricated to replace the map holders that are included as a standard component of a stock or original seat in a vehicle 10 using the same attachment mechanism (e.g., screws, snaps, glue, etc.).

In the exemplary embodiment component 604 includes a plurality of apertures or slots 606, similar to slots 470 shown in FIG. 6, that enable assembly 600 and/or component 604 to function as a PALS or MOLLE system. In one embodiment, slots 606 are formed in component 604 by removing material from component 604 via a laser cutter. Alternatively, slots 606 can be formed in component 604 using any device that facilitates creating a grid including, but not limited to including, a plotter, cutter, notcher, ultrasonic welder, and mold. In one embodiment, component 604 is fabricated from polyurethane. Alternatively, component 604 can be fabricated from any material that supports accessories including, but not limited to, steel, aluminum, carbon fiber, polyethylene, polypropylene, and polyvinyl chloride. In some embodiments, component 604 and/or frame 602 is molded to a predetermined shape that contours to particular seats. In such an embodiment, component and/or frame can be molded from any material that provides the predetermined strength requirements including, but not limited to, hypalon, rubber, polyester, and nylon.

In the exemplary embodiment, slots 606 are formed in component 604 such that a slot width or length 610 is in the range of 0.25 inches to 3 inches with a slot height 612 in the range of 0.05 inches to 2 inches. In one embodiment, slots 606 have a length 610 of approximately 1.25 inches and a height 612 of approximately 0.125 inches. In some embodiments, component 604 includes a support 620 vertically positioned between slots 606 having a width in the range of 0.1 inches to 2 inches.

In the exemplary embodiment, adjacent slots 606 are formed with a horizontal distance 614 between slots 606. In the exemplary embodiment horizontal distance 614 is approximately 1 inch, however, any distance can be used in the range of 0.1 inches to 3 inches. Likewise, in the exemplary embodiment, slots 606 are formed with a vertical distance 616 between slots of approximately 1 inch. As such, if slots 606 have a height 612 of 0.125 inches, the vertical distance 616 between adjacent slots 606 is 0.875 inches. In the exemplary embodiment, frame 602 is coupled to component 604 with stitching, however, frame 602 and component 604 can be coupled together with any component that facilitates securement to seat 400 including but not limited to including, hook and loop material (Velcro), glue, snaps, screws, ultrasonic welding, and heat staking.

In one embodiment, assembly 600 is secured to seat 400 by bolting or screwing frame 602 to portions of seat 400 (e.g., rear back portion 422 and/or frame 401). In one embodiment, frame 602 can be fabricated to include projections that mate with apertures or slots formed in the rear back portion 422 of seat 400. In an alternative embodiment, assembly 600 is secured to seat 400 by stabilizing at least one member 630 extending from frame 602 down portion 422 and under bottom base portion 412 enabling stabilizing member 630 to couple to frame 401. Alternatively, assembly 600 can couple to seat 400 with any component that facilitates securement to seat 400 including but not limited to including, hook and loop material (Velcro), glue, snaps, screws, ultrasonic welding, heat staking, and stitching. In some embodiments, assembly 600 is positioned on seat 400 by straps or posts 640 that extend from headrest 430 and/or frame 410 extending through seat 400. It should also be noted that straps or posts 640 could also extend from any portion of vehicle 10 to secure assembly 600 including, but not limited to, the floors, roofs, and center consoles.

Figure 9:
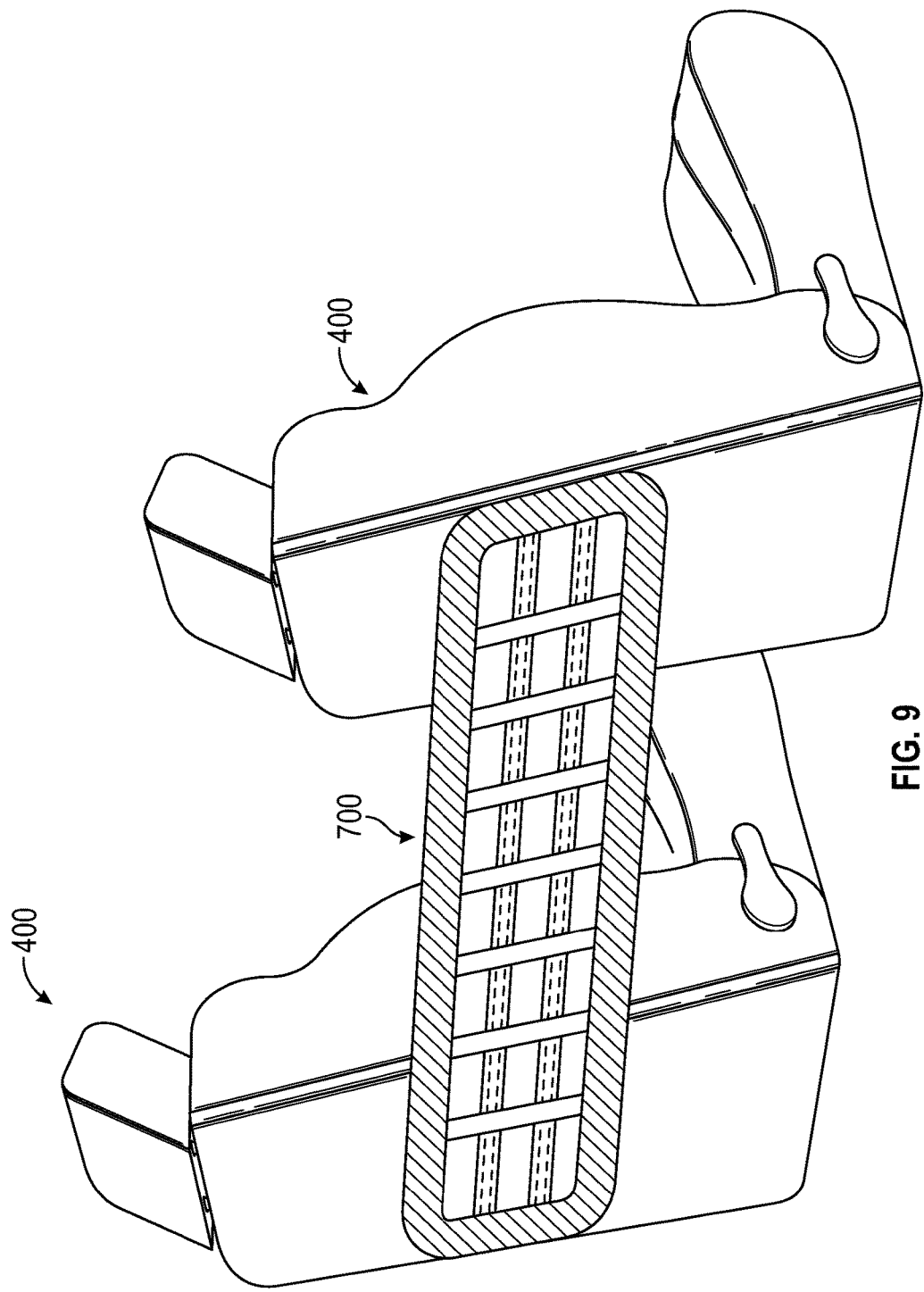

FIG. 9 is rear perspective view of seats 400 having an accessory assembly 700 that extends between two adjacent seats 400. Assembly 700 is contemplated as having the capabilities, materials, dimensions, and securement mechanisms of assemblies 500 and 600 with the ability to extend across adjacent seats 400. As such, in one embodiment, assembly 700 includes straps that are fabricated with a height to be in the range of 0.25 inches to 3 inches and a preferred height of approximately one inch. In such an embodiment, sections of the straps are fabricated to a width in the range of 0.25 inches to 4 inches with a preferred width of approximately 1.5 inches and being positioned a distance apart in the range of 0.25 inches to 4 inches with a preferred distance of approximately 1 inch.

It should be noted that any of the assemblies 500 and 600 described herein can be fabricated to become assembly 700 that extends from a first seat to an adjacent seat. In such embodiments, assembly 700 enables attachment of MOLLE or PALS accessories (e.g., gear and pouches) to provide users the ability to utilize storage behind seats 400, as well as between seats 400. Assembly 700 also provides users access to both the front and the rear of assembly 700 so the attachment system is accessible on either side of seats 400. In addition to providing additional storage within vehicle 10, assembly 700 can also function as a pet barrier, cargo net, etc. It should also be noted that while assemblies 500, 600, and 700 have been depicted as being utilized with a single person seat, the methods and systems described herein (e.g., assemblies 500, 600, and 700) can be utilized on seats configured to accommodate multiple riders (e.g., bench seats).

Exemplary embodiments of vehicle seat are described above in detail. The systems are not limited to the specific embodiments described herein, but rather, components of systems that may be utilized independently and separately from other components described herein. For example, the seats described herein may also be used in combination with any vehicle including but not limited to scooters, mopeds, monkey bikes, Welbikes, minibikes, enduro motorcycles, all-terrain vehicles (ATV), four-wheelers, three-wheelers, utility task vehicles (UTV), military light utility vehicles, off-road vehicles, sport utility vehicles (SUV), Jeeps, bicycles, trucks, delivery trucks, agricultural vehicles, tractors, construction vehicles, earth movers, bulldozers, planes, boats, buses, multi-stop trucks, walk-in delivery or step vans, and motorized bicycles. One advantage of the systems and methods described herein is that a vehicle is not limited to a particular storage option provided by the vehicle manufacturer but rather provides a user the flexibility of quickly removing and/or adding accessories and/or storage that are chosen for a particular trip.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A seat for use with a vehicle, the seat comprising:
   a seat frame;
   a cushioning material positioned adjacent to the seat frame;
   an outer cover positioned over the seat frame and the cushioning material to form a base and back portion, wherein the back portion includes a front back portion and a rear back portion;
   an accessory assembly on the rear back portion and coupled to at least one of the seat frame and the rear back portion, the accessory assembly comprising:
      plastic accessory frame having vertical and horizontal frame edge margins;
      plastic stabilizing components coupled to the plastic accessory frame and having lengths extending between the horizontal frame edge margins, wherein the plastic stabilizing components are spaced apart from one another between the vertical frame edge margins; and
      straps coupled to the plastic accessory frame and having lengths extending between the vertical frame edge margins, wherein the straps are spaced apart from one another between the horizontal frame edge margins and are generally cross-wise relative to the plastic stabilizing components.

2. The seat as according to claim 1, wherein the rear back portion defines a plurality of slots, wherein the plastic accessory frame further comprises a plurality of projections mateably received in the slots to secure the plastic accessory assembly to the rear back portion.

3. The seat as according to claim 1, further comprising a headrest moveably coupled to the rear back portion.

4. The seat as according to claim 3, wherein the plastic accessory frame and the plastic stabilizing components are molded together.

5. The seat as according to claim 1, wherein the vehicle is at least one of a sport utility vehicle, and an off-road vehicle.

6. The seat as according to claim 1, wherein the outer covering is at least one of leather and cloth.

7. The seat as according to claim 1, wherein the plastic accessory assembly is coupled to the seat frame by a screw.

8. The seat as according to claim 1, wherein the strap comprises at least one of polyester, polypropylene, and nylon.

9. The seat as according to claim 1, wherein the straps are generally flexible.

10. The seat as according to claim 1, wherein the straps are coupled to the plastic stabilizing components.

11. The seat as according to claim 1, wherein the plastic accessory assembly is coupled to the rear back portion by snap-fit connection.

12. A vehicle comprising:
   a seat having a seat frame, a cushioning material positioned adjacent to the seat frame, and an outer cover positioned over the seat frame and the cushioning material to form a base and back portion, wherein the back portion includes a front back portion and a rear back portion;
   an accessory assembly on the rear back portion and coupled to at least one of the seat frame and the rear back portion, the accessory assembly comprising:
      plastic accessory frame having vertical and horizontal frame edge margins;
      plastic stabilizing components coupled to the plastic accessory frame and having lengths extending between the horizontal frame edge margins, wherein the plastic stabilizing components are spaced apart from one another between the vertical frame edge margins; and
      straps coupled to the plastic accessory frame and having lengths extending between the vertical frame edge margins, wherein the straps are spaced apart from one another between the horizontal frame edge margins and are generally cross-wise relative to the plastic stabilizing components.

13. The vehicle according to claim 12, wherein the vehicle is at least one of is at least one of a sport utility vehicle, and an off-road vehicle.

* * * * *